May 29, 1934.  C. C. FARMER ET AL  1,961,100
FLUID PRESSURE BRAKE
Filed Oct. 16, 1930
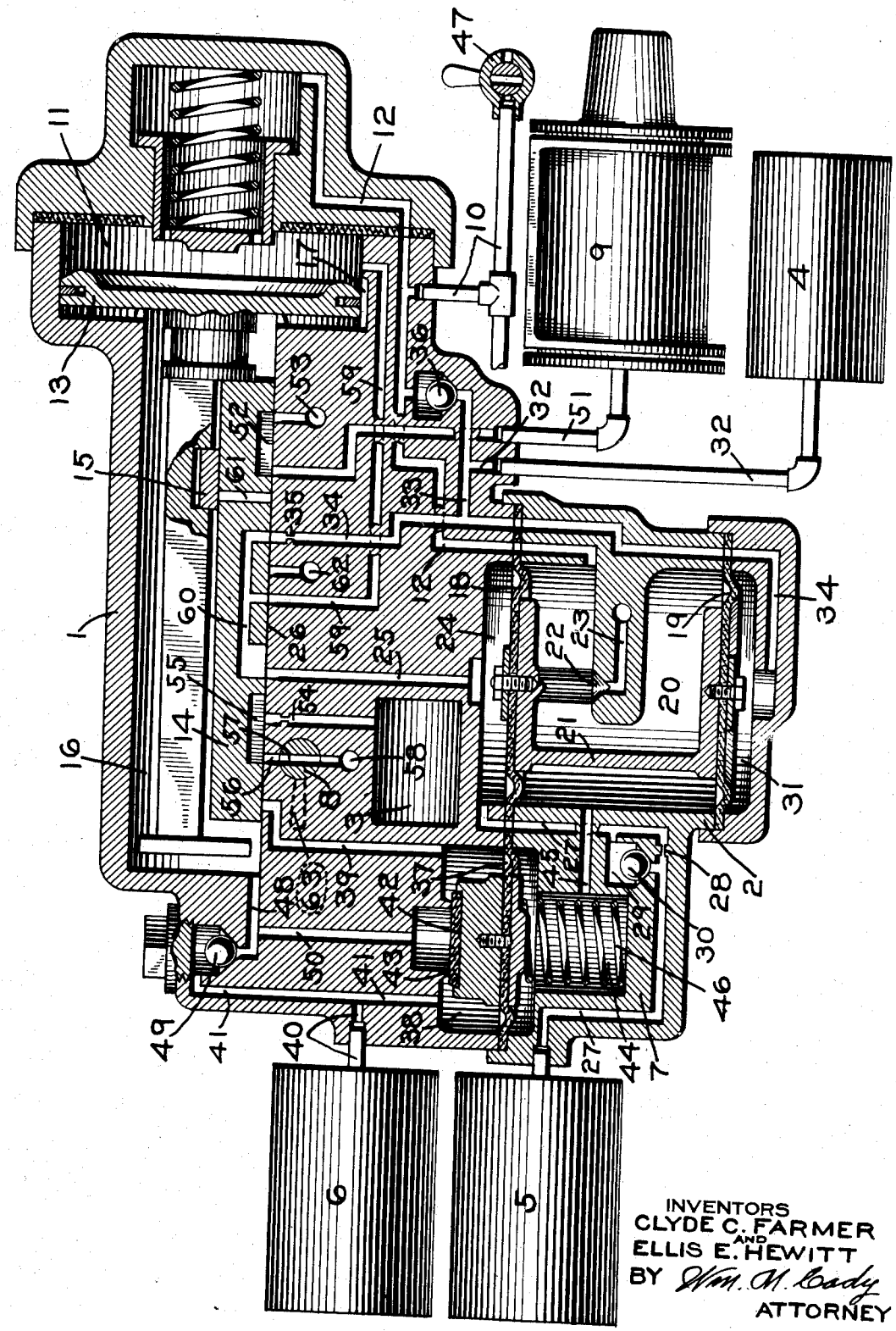
INVENTORS
CLYDE C. FARMER
AND
ELLIS E. HEWITT
BY Wm. M. Cady
ATTORNEY Patented May 29, 1934

1,961,100

UNITED STATES PATENT OFFICE 1,961,100

FLUID PRESSURE BRAKE

Clyde C. Farmer, Pittsburgh, and Ellis E. Hewitt, Edgewood, Pa., assignors to The Westinghouse Air Brake Company, Wilmerding, Pa., a corporation of Pennsylvania Application October 16, 1930, Serial No. 489,155

36 Claims. (Cl. 303—41)

This invention relates to fluid pressure brake equipment for railway rolling stock and more particularly to such equipment for use on a caboose or other rear unit or units of a train.

With the increase in train lengths, the difficulty of applying the brakes without causing excessive shocks, due to the running in of the slack between the cars before the brakes are applied on the rear cars of the train, is correspondingly increased.

In actual service, with each car and the caboose of a long train equipped with the usual type of fluid pressure brake apparatus, difficulty is encountered in causing all brakes on the train to promptly apply because of the slow rate of brake pipe reduction. This slow rate of brake pipe reduction is due to the great length of the brake pipe, to the auxiliary reservoirs of the brake equipment discharging fluid into the brake pipe through the feed grooves around the triple valve pistons, and due to the fact that the increased amount of fluid under pressure in the brake pipe must be discharged through the brake valve device, so that excessive heavy reductions in brake pipe pressure must be made to insure the application of all brakes. Consequently, shocks are produced, not only because of the slow serial application of the brakes, but also because the brakes apply non-uniformly in degree of brake force.

A further difficulty is encountered in that, if an angle cock in the train should be inadvertently or maliciously closed, an application of the brakes back of the closed cock could not be effected since, the average brake pipe leakage to be expected on a train is at such a slow rate that fluid under pressure from the auxiliary reservoirs flows through the feed grooves around the triple valve pistons of the equipments back of the closed angle cock without a sufficient pressure differential being created on each piston to cause it to be operated to brake applying position.

The principal object of our invention is to provide a fluid pressure brake apparatus for use on the rear end of a train which will obviate the above mentioned difficulties in controlling the fluid pressure brakes on a train.

A specific object of our invention is to provide the caboose or other rear unit of a train with a fluid pressure brake apparatus which is operative to effect a predetermined reduction in brake pipe pressure at the rear of the train in the event of the pressure being reduced at a rate slower than a service rate such as a reduction effected by leakage of fluid from the brake pipe back of a closed angle cock.

A further specific object of our invention is to provide fluid pressure brake apparatus operative to effect a predetermined reduction in brake pipe pressure at a service rate at the rear end of a train in the event of brake pipe pressure at the rear end being reduced at a rate slower than a service rate in initiating an application of the brakes from the head end of the train.

A further object of our invention is to provide means operative to render ineffective the means for effecting a brake pipe reduction at the rear end of a train.

Other objects and advantages will appear in the following more detailed description of the invention.

In the accompanying drawing, the single figure is a diagrammatic view, mainly in section, of a fluid pressure brake apparatus embodying our invention.

As shown in the drawing, the fluid pressure brake apparatus for a caboose may comprise a triple valve device 1, a discharge valve device 2, an expansion chamber or reservoir 3, a stabilizing reservoir 4, an equalizing reservoir 5, an auxiliary reservoir 6, a valve device 7, a cut-out cock 8, a brake cylinder 9, and a brake pipe 10.

The triple valve device 1, as shown in the drawing, may be of the type in which the piston makes full traverse in effecting a service application of the brakes and comprises a casing having a piston chamber 11 connected to the brake pipe 10 through a passage 12 and containing a piston 13 adapted to control the operation of main slide valve 14 and an auxiliary slide valve 15 contained in a valve chamber 16 connected when the piston 13 is in release position to the piston chamber 11 through a feed groove 17 extending around the piston from one side thereof to the other.

The discharge valve device 2 is for the purpose of venting fluid under pressure from the brake pipe 10 and may comprise a casing in which there is mounted, in spaced relation to each other, flexible diaphragms 18 and 19 of equal area. Contained in a chamber 20 between the diaphragms 18 and 19 and interposed between and secured to both diaphragms is a discharge valve member 21 having a discharge valve 22 adapted to cooperate with a valve seat formed on the casing for controlling communication from the chamber 20 to the atmosphere through a passage 23. The valve chamber 20 is constantly connected to the brake pipe 10 and piston chamber 11 in the triple valve device through passage 12.

At the upper side of the flexible diaphragm 18 of the discharge valve device is a chamber 24 which leads through a passage 25 to the seat 26 of the main slide valve of the triple valve device and which is constantly connected to the equalizing reservoir 5 through a passage 27 which contains a restriction 28 for restricting the flow of fluid from the chamber 24 to the reservoir 5. Connected to the passage 27 at each side of the restriction 28 is a passage 29 containing a ball check valve 30 which is adapted to prevent the flow of fluid under pressure through the passage 29 from the passage 27 at one side of the restriction 28 to the passage 27 at the other side of the restriction. The passage 29 and ball check valve 30 constitute a by-pass about the restriction 28 for the flow of fluid under pressure at an unrestricted rate from the reservoir to the chamber 24.

At the underside of the flexible diaphragm 19 of the discharge valve device is a chamber 31 to which the stabilizing reservoir 4 is constantly connected through a pipe and passage 32 and passages 33 and 34. The passage 34 leads to the seat 26 of the main slide valve of the triple valve device and at a point beyond the juncture of the passages 33 and 34 is provided with a restriction 35. One end of the passage 33, as just described, connects with the passage 34 and the other end connects with the passage 12, there being a ball check valve 36 interposed on the passage 33 at a point between the passage 32 and the passage 12 which prevents fluid under pressure from the brake pipe from flowing through the passage 33 to the passages 32 and 34. The purpose of the stabilizing reservoir 4 is to add volume to the chamber 31 to render the discharge valve device 2 less sensitive to fluctuations in the pressure of fluid supplied from the brake pipe.

The valve device 7 is for the purpose of controlling the supply of fluid under pressure from the auxiliary reservoir 6 to the valve chamber 16 in the triple valve device when the triple valve piston 13 is in release position and a reduction in brake pipe pressure occurs and may comprise a casing in which there is mounted a flexible diaphragm 37 having a chamber 38 at one side which is constantly open to a passage 39 leading to the slide valve seat 26 of the triple valve device and to which the auxiliary reservoir is constantly connected through a pipe and passage 40 and a passage 41. Contained in the chamber 38 and secured to the flexible diaphragm is a valve 42 which is adapted to seat on an annular seat rib 43. At the other side of the diaphragm there is a chamber 44 which is constantly connected to the valve chamber 20 in the discharge valve device 2 through a passage 45. Contained in the chamber 44 and interposed between and engaging one side of the diaphragm 37 and the casing is a light coil spring 46, the pressure of which tends to seat the valve 42.

In operation, when the rear angle cock 47 on the caboose is closed and the brake pipe 10 is supplied with fluid under pressure in the usual manner, the triple valve piston 13 is shifted to its release position carrying with it the auxiliary and main slide valves 15 and 14 respectively to their release positions. With the piston 13 in release position, fluid under pressure in the chamber 11, as supplied from the brake pipe 10 through passage 12, flows through the feed groove 17 around the piston to valve chamber 16 and from thence to the auxiliary reservoir 6 through a passage 48, past a ball check valve 49, through passage 41 and passage and pipe 40. Fluid under pressure from the passage 48 flows through a passage 50 to the inner seated area of the valve 42 of the valve device 7 and fluid under pressure from the passage 41 flows to the chamber 38 in this valve device.

Fluid under pressure supplied to the passage 12 also flows therethrough to the chamber 20 of the discharge valve device 2 and from thence through passage 45 flows to the chamber 44 in the valve device.

With the main slide valve 14 of the triple valve device in its release position, the brake cylinder 9 is connected to the atmosphere through a pipe and passage 51, a cavity 52 in the slide valve 14 and a passage 53, and the expansion chamber 3 is connected to the atmosphere through a restricted passage 54, a cavity 55 in the slide valve, a passage 56, a passage 57 in the plug valve of the cut-out cock 8, and a passage 58.

Further, with the main slide valve 14 in its release position, fluid under pressure supplied to the piston chamber 11 in the triple valve device, flows at an unrestricted rate to the diaphragm chamber 24 in the discharge valve device 2 through a passage 59, a port 60 in the slide valve 14 and passage 25. From the port 60 fluid under pressure also flows to the diaphragm chamber 31 in the discharge valve device through the restriction 35 and passage 34. Fluid under pressure supplied to the passage 34 flows to the stabilizing reservoir 4 through passage 33 and passage and pipe 32. It will here be noted that the ball check valve 36 prevents the flow of fluid under pressure from the passage 12 to the passage 33 so that the rate at which the chamber 31 and reservoir 4 are charged is governed entirely by the flow of fluid through the restriction 35.

Fluid under pressure supplied to the diaphragm chamber 24 in the discharge valve device flows to the equalizing reservoir 5 through passage 27 at a rate governed by the restriction 28, the ball check valve 30 preventing the flow of fluid around the restriction by way of passage 29.

During the charging period, the restriction 28 so governs the rate of flow of fluid under pressure from the diaphragm chamber 24 in the discharge valve device 2 and the restriction 35 so governs the rate of flow of fluid under pressure to the diaphragm chamber 31, that fluid is maintained at a higher pressure in chamber 24 than is obtained in the chamber 31, so that the valve 22 is maintained seated, thus preventing the flow of fluid under pressure from the brake pipe to the atmosphere. However, when the equipment is fully charged, the pressures on both sides of both diaphragms are equal and the valve 22 is maintained seated by the force of gravity.

When the apparatus is fully charged, the pressures of fluid on both sides of the flexible diaphragm 37 of the supply valve device 7 are substantially equal and due to this, the pressure of the spring 46 maintains the valve 42 seated on the seat rib 43.

In effecting a service application of the brakes on a train, the engineer's brake valve device is manipulated to service position in which a reduction in brake pipe pressure is effected in the usual manner. At the front end of the train this reduction will be at a service rate and at the rear end of the train may be such that the triple valve device will not be caused to operate to effect an application of the brakes. When a caboose, equipped with our present apparatus, constitutes the rear unit of a train, and when the brake pipe pressure is reducing at a rate slower than a service rate, fluid under pressure in the valve chamber 16 may flow to the triple valve piston chamber 11 and then to the brake pipe 10 through passage 11 at the same rate as the brake pipe is reducing. As the pressure of fluid in the valve chamber 16 thus reduces, the ball check valve 49 prevents the flow of fluid under pressure from the auxiliary reservoir to this chamber, thus preventing a reduction in auxiliary reservoir pressure.

Now when the brake pipe pressure has been reduced a small amount, say for instance two pounds, and a corresponding reduction has been effected in the chamber 44 of the supply valve device through the passage 45, diaphragm chamber 20 in the discharge valve device, passage 12 and the brake pipe 10, the pressure of fluid in the diaphragm chamber 38 in the valve device 7 causes the diaphragm 37 to be flexed downwardly against the opposing pressure of the spring 46, unseating the valve 42 from the seat rib 43.

As soon as the valve 42 is thus unseated, fluid under pressure flows from the auxiliary reservoir to the valve chamber 16 at an unrestricted rate through pipe and passage 40, passage 41, diaphragm chamber 38, past the unseated valve 42 and passages 50 and 48. The rate at which fluid under pressure is thus supplied to the chamber is considerably faster than the rate at which fluid can flow therefrom through the feed groove 17, so that the pressure of fluid in the chamber 16 is increased sufficiently to cause the triple valve piston 13 to quickly move toward the right, first shifting the auxiliary slide valve 15 relative to the main slide valve 14 so as to uncover a service port 61 in the main slide valve and then shifting the main slide valve and auxiliary slide valve to their service positions so that the service port 61 registers with passage 51. Slightly in advance of the registration of the port 61 with the passage 51, the main slide valve uncovers the passage 39 leading from the diaphragm chamber 38 in the supply valve device, so that when the port 61 registers with the passage 51, fluid under pressure is supplied from the auxiliary reservoir 6 to the brake cylinder by way of pipe and passage 40, passage 41, diaphragm chamber 38, passage 39, valve chamber 16 in the triple valve device, port 61 and passage and pipe 51. It will thus be seen that when the triple valve device is in service position, fluid under pressure is supplied from the auxiliary reservoir to the brake cylinder 9 by way of passage 39 regardless of the position of the valve 42.

Further with the main slide valve 14 in service position fluid under pressure from the diaphragm chamber 24 in the discharge valve device as supplied from the equalizing reservoir 5 by way of passages 27 and 29 and past the ball check valve 30, flows to the expansion chamber 3 through passage 25, cavity 55 in the main slide valve 14 and restricted passage 54, thus reducing the pressure of fluid in chamber 24 and equalizing reservoirs. Upon thus effecting the reduction in the pressure of fluid in the chamber 24, fluid under pressure in the chamber 31 and stabilizing reservoir causes the diaphragm 19 to be flexed upwardly lifting the valve member sufficiently to unseat the discharge valve 22. With the valve 22 thus unseated, fluid under pressure from the brake pipe is discharged to the atmosphere through passage 12, chamber 20 in the discharge valve device and passage 23.

As the pressure of fluid in the brake pipe reduces, the pressure of fluid in the diaphragm chamber 31 reduces with it since fluid under pressure from this chamber flows to the brake pipe through passages 34 and 33, past the ball check valve 36 and passage 12. Now when the pressure of fluid in the chamber 31, which pressure corresponds to brake pipe pressure, is reduced slightly below the equalized pressure of the equalizing reservoir 5 and expansion chamber 3, present in chamber 24, the pressure of fluid in this diaphragm chamber causes the diaphragm 18 to flex downwardly seating the valve 22 and thus closing off the further flow of fluid under pressure from the brake pipe to the atmosphere.

When the valve device 2 operates in the manner just described, the rate of brake pipe reduction resulting therefrom at the rear of the train preferably corresponds with the rate of brake pipe reduction at the head end of the train, thus insuring the desired even braking action throughout the length of the train.

With the main slide valve 14 in service position, the port 60 registers with a passage 62 leading to the atmosphere, thus venting the under side of the valve so that fluid under pressure in the valve chamber 16 will cause the valve to frictionally engage the valve seat more firmly. This is done for the purpose of preventing accidental movement of the piston toward release position due to surges in brake pipe pressure.

To release the brakes, the brake pipe pressure is increased in the usual manner, causing the apparatus to be recharged with fluid under pressure and to operate to connect the brake cylinder and the expansion reservoir to the atmosphere in the same manner as described in connection with the initial charging of the apparatus.

Since this apparatus is sensitive to a slight reduction in brake pipe pressure, the average leakage from the brake pipe back of an angle cock which has been inadvertently or maliciously closed, will cause an application of the brakes to be effected on the cars back of the closed angle cock.

In descending a grade, where it is desired to cycle the brakes on the train, the discharge valve device 2 on the caboose should be rendered ineffective to release fluid under pressure from the brake pipe after each application of the brakes, and it is for this purpose the cut-out cock 8 is provided. To do this, a trainman rotates the plug valve of the cut-out cock 8, through the medium of a handle 63, to a position in which communication from the passage 56 to the passage 57 leading to the atmosphere is closed off. Now when the first application of the brakes is effected, the discharge valve device will be caused to operate to vent fluid under pressure from the brake pipe in the same manner as before described in connect on with the effecting of a service application. However, when the main slide valve 14 is returned to release position, in which the cavity 55 connects the passages 54 and 56, the cut-out cock being closed prevents the flow of fluid under pressure from the expansion reservoir to the atmosphere. Since the fluid under pressure is thus bottled up in the chamber 3, the reductions in the pressure of fluid in the chamber 24 in subsequent brake applications will be insufficient to permit the operation of the device to vent fluid under pressure from the brake pipe.

If the brake pipe pressure on a vehicle equipped with our proposed equipment should be reduced at substantially a service rate or faster, the discharge valve device 2 will not operate to further reduce brake pipe pressure, thus preventing the brake pipe pressure from being reduced at an undesired rate, such as an emergency rate, when only a service rate of reduction is intended. In this connection it will be noted that when the brake pipe reduction is at a service rate, the pressure of fluid in the diaphragm chamber 24, which reduces through the restricted passage 54 at substantially a service rate, and the pressures of fluid in chambers 20 and 31, which reduce with the brake pipe pressure, will all be substantially equal, so that the valve 22 will be maintained seated by the force of gravity. If the reduction in brake pipe pressure should be at a faster rate, the pressure of fluid in the chamber 24 acts upon the diaphragm 18 to maintain the valve 22 seated. If an over reduction in brake pipe pressure should be effected, the pressure of fluid in the chamber 24 acting on the diaphragm 18 will maintain the valve 22 seated, thus preventing the unnecessary loss of fluid under pressure from the brake pipe.

While one illustrative embodiment of the invention has been described in detail, it is not our intention to limit its scope to that embodiment or otherwise than by the terms of the appended claims.

Having now described our invention, what we claim as new and desire to secure by Letters Patent, is:

1. In a fluid pressure brake, the combination with a brake pipe, of a brake controlling valve device subject to the opposing pressures of the brake pipe and a chamber, a normally charged reservoir, means normally closing a communication from the reservoir to the chamber, and means operated upon a predetermined reduction in brake pipe pressure for actuating the first mentioned means to supply fluid under pressure from said reservoir to said chamber by way of said communication.

2. In a fluid pressure brake, the combination with a brake pipe, of a brake controlling valve device subject to the opposing pressures of the brake pipe and a chamber, a reservoir normally charged with fluid under pressure supplied from said chamber, means normally preventing the flow of fluid from said reservoir to said chamber, and means operated upon a predetermined reduction in brake pipe pressure for actuating the first mentioned means to supply fluid under pressure from said reservoir to said chamber.

3. In a fluid pressure brake, the combination with a brake pipe, of a brake controlling valve device subject to the opposing pressures of the brake pipe and a chamber, a reservoir normally charged with fluid under pressure supplied from said brake pipe to said chamber, a check valve preventing back flow of fluid from the reservoir to the chamber, a normally seated supply valve, and means operated upon a predetermined reduction in brake pipe pressure for actuating said supply valve to supply fluid under pressure from said reservoir to said chamber.

4. In a fluid pressure brake, the combination with a brake pipe, of a brake controlling valve device subject to the opposing pressures of the brake pipe and a chamber, a reservoir normally charged with fluid under pressure supplied from said chamber, means preventing back flow of fluid under pressure from said reservoir to said chamber, and means operated upon a predetermined reduction in brake pipe pressure for supplying fluid under pressure from said reservoir to said chamber.

5. In a fluid pressure brake, the combination with a brake pipe, of a brake controlling valve device subject to the opposing pressures of the brake pipe and a chamber, a normally charged reservoir, a valve closing a communication from the reservoir to the chamber, and means subject to the opposing pressures of the brake pipe and said reservoir and operated upon a predetermined reduction in brake pipe pressure for actuating said valve to supply fluid under pressure from said reservoir to said chamber.

6. In a fluid pressure brake, the combination with a brake pipe, of a valve device for effecting a reduction in brake pipe pressure at a service rate, a triple valve device operative to effect an application of the brakes and to effect the operation of said valve device, and valve means operated upon a predetermined reduction in brake pipe pressure to supply fluid under pressure to the triple valve device for effecting the operation of the triple valve device.

7. In a fluid pressure brake apparatus for a rear car of a train, the combination with a brake pipe and a reservoir, of a brake controlling valve device comprising valve means and a piston subject to variations in the pressures of fluid in the brake pipe and a chamber, said valve device having a feed groove passing around said piston when the piston is in brake releasing position and through which fluid under pressure is supplied from the brake pipe to said chamber and reservoir and through which fluid under pressure flows back from said chamber to the brake pipe when a reduction in brake pipe pressure is initiated in effecting an application of the brakes, means preventing back flow of fluid from said reservoir to said chamber when the pressure of fluid in said chamber is reduced by the back flow of fluid through said feed groove, and means operative upon a predetermined brake pipe reduction for supplying fluid under pressure from said reservoir to said chamber to cause said piston to be shifted to brake applying position.

8. In a fluid pressure brake apparatus for a rear car of a train, the combination with a brake pipe and a reservoir, of a brake controlling valve device comprising valve means and a piston subject to variations in the pressures of fluid in the brake pipe and a chamber, said valve device having a feed groove passing around said piston when the piston is in brake releasing position and through which fluid under pressure is supplied from the brake pipe to said chamber and reservoir and through which fluid under pressure flows back from said chamber to the brake pipe when a reduction in brake pipe pressure is initiated in effecting an application of the brakes, means preventing back flow of fluid from said reservoir to said chamber when the pressure of fluid in said chamber is reduced by the back flow of fluid through said feed groove, and means operative upon a predetermined brake pipe reduction for establishing communication through which fluid under pressure flows from said reservoir to said chamber at a rate exceeding the rate of flow of fluid under pressure from said chamber to said brake pipe by way of said feed groove to create a pressure differential on said piston sufficient to cause it to move to brake applying position.

9. In a fluid pressure brake apparatus for a rear car of a train, the combination with a brake pipe and a reservoir, of a brake controlling valve device comprising valve means and a piston subject to variations in the pressures of fluid in the brake pipe and a chamber, said valve device having a feed groove passing around said piston when the piston is in brake releasing position and through which fluid under pressure is supplied from the brake pipe to said chamber and reservoir and through which fluid under pressure flows back from said chamber to the brake pipe when a reduction in brake pipe pressure is initiated in effecting an application of the brakes, means preventing back flow of fluid from said reservoir to said chamber when the pressure of fluid in said chamber is reduced by the back flow of fluid through said feed groove, means operative upon a predetermined reduction in brake pipe pressure for supplying fluid under pressure from said reservoir to said chamber to cause said piston to actuate said valve means to brake applying positions, and means for effecting a predetermined reduction in brake pipe pressure when said valve means is in brake applying position.

10. In a fluid pressure brake apparatus, the combination with a brake pipe and a triple valve device operative upon a predetermined light reduction in brake pipe pressure for effecting a service application of the brakes, of means operative automatically after the operation of said triple valve device to effect a service application of the brakes for effecting a predetermined service reduction in brake pipe pressure, and means associated with said triple valve device for controlling the operation of the first mentioned means.

11. In a fluid pressure brake apparatus, the combination with a brake pipe and a triple valve device, of means operative upon effecting a predetermined light reduction in brake pipe pressure for supplying fluid under pressure to said triple valve device to cause the device to operate to effect an application of the brakes, and pneumatically controlled valve means operative when said triple valve device is in brake applying position for venting fluid under pressure from said brake pipe.

12. In a fluid pressure brake apparatus, the combination with a brake pipe and a triple valve device operative upon a predetermined light reduction in brake pipe pressure for effecting an application of the brakes, a reservoir charged with fluid under pressure from said brake pipe, valve means subject to the pressure of fluid from said reservoir and the pressure of fluid from said brake pipe and operative upon a reduction in the pressure of fluid in said reservoir for venting fluid under pressure from said brake pipe, and means included in said triple valve device for reducing the pressure of fluid in said reservoir when the triple valve device is in brake applying position.

13. In a fluid pressure brake apparatus, the combination with a brake pipe and a triple valve device operative upon a predetermined light reduction in brake pipe pressure for effecting an application of the brakes, a reservoir charged with fluid under pressure from said brake pipe, valve means subject to the pressure of fluid from said reservoir and the pressure of fluid from said brake pipe and operative upon a reduction in the pressure of fluid in said reservoir for venting fluid under pressure from said brake pipe, a chamber normally connected to the atmosphere through the medium of said triple valve device, and means included in said triple valve device for establishing communication through which fluid under pressure flows to said chamber to effect a predetermined reduction in the pressure of fluid in said reservoir.

14. In a fluid pressure brake apparatus, the combination with a brake pipe and a triple valve device operative upon a predetermined light reduction in brake pipe pressure for effecting an application of the brakes, a reservoir charged with fluid under pressure from said brake pipe, valve means subject to the pressure of fluid from said reservoir and the pressure of fluid from said brake pipe and operative upon a reduction in the pressure of fluid in said reservoir for venting fluid under pressure from said brake pipe, and means included in said triple valve device for reducing the pressure of fluid in said reservoir when the triple valve device is in brake applying position, said valve means being operative to close off the flow of fluid from said brake pipe when the reduced pressure in said reservoir and brake pipe pressure are substantially equal.

15. In a fluid pressure brake apparatus, the combination with a brake pipe and a triple valve device operative upon a predetermined reduction in brake pipe pressure for effecting an application of the brakes and operative upon an increase in brake pipe pressure for effecting the release of the brakes, of valve means subject to the pressure of fluid supplied to two chambers from said brake pipe when the triple valve device is in release position and operative to vent fluid under pressure from the brake pipe when the pressure of fluid in one of said chambers is lower than the pressure of fluid in the other, and means for controlling the flow of fluid from said brake pipe to said chambers to prevent the operation of said valve means to release fluid under pressure when the triple valve device is in release position.

16. In a fluid pressure brake apparatus, the combination with a brake pipe and a triple valve device operative upon a predetermined reduction in brake pipe pressure for effecting an application of the brakes and operative upon an increase in brake pipe pressure for effecting the release of the brakes, of valve means subject on opposite sides to fluid under pressure supplied from the brake pipe when the triple valve is in release position and operative when the pressure of fluid on one side is higher than the pressure of fluid on the other side to discharge fluid under pressure from the brake pipe, and means for governing the flow of fluid from said brake pipe to one side of said valve means to prevent the operation of the valve means to discharge fluid from the brake pipe.

17. In a fluid pressure brake apparatus, the combination with a brake pipe and a triple valve device operative upon a predetermined reduction in brake pipe pressure for effecting an application of the brakes and operative upon an increase in brake pipe pressure for effecting the release of the brakes, of valve means subject on opposite sides to fluid under pressure supplied from the brake pipe when the triple valve device is in release position and operative when the pressure of fluid on the upper side thereof is lower than the pressure of fluid on the under side to discharge fluid under pressure from the brake pipe, and means for restricting the flow of fluid from said brake pipe to the under side of said valve means.

18. In a fluid pressure brake apparatus, the combination with a brake pipe and a triple valve device operative upon a predetermined reduction in brake pipe pressure for effecting an application of the brakes and operative upon an increase in brake pipe pressure for effecting the release of the brakes, of valve means subject on opposite sides to fluid under pressure supplied from the brake pipe when the triple valve device is in release position and operative when the pressure of fluid on the upper side thereof is lower than the pressure of fluid on the under side to discharge fluid under pressure from the brake pipe, and means for preventing a higher pressure from being built up on the under side of said valve means than is built up on the upper side thereof when fluid under pressure is being supplied from said brake pipe.

19. In a fluid pressure brake apparatus, the combination with a brake pipe and a triple valve device operative upon a predetermined reduction in brake pipe pressure for effecting an application of the brakes and operative upon an increase in brake pipe pressure for effecting the release of the brakes, of valve means subject on opposite sides to fluid under pressure supplied from the brake pipe when the triple valve device is in release position and operative when the pressure of fluid on the upper side thereof is lower than the pressure of fluid on the under side to discharge fluid under pressure from the brake pipe, a reservoir supplied with fluid under pressure from the upper side of said valve means, means for restricting the rate of flow of fluid under pressure to said reservoir, and means for restricting the rate of flow of fluid under pressure from the brake pipe to the under side of said valve means, the relative rates at which fluid under pressure is supplied to the reservoir and to the under side of said valve means being such as to insure a greater pressure on the upper side of the valve means than is obtained on the under side thereof when fluid under pressure is being supplied from said brake pipe.

20. In a fluid pressure brake, the combination with a brake pipe, a triple valve device and an auxiliary reservoir charged with fluid under pressure when the triple valve device is in brake releasing position, of a valve constantly preventing back flow of fluid under pressure from said reservoir to said triple valve device, and valve means operative upon a predetermined brake pipe reduction for establishing communication through which fluid under pressure flows from said reservoir to said triple valve device.

21. In a fluid pressure brake, the combination with a brake pipe, a triple valve device and an auxiliary reservoir charged with fluid under pressure when the triple valve device is in brake releasing position, of a valve constantly preventing back flow of fluid under pressure from said reservoir to said triple valve device, and valve means subject to the opposing pressures of said reservoir and brake pipe and operative upon a predetermined reduction in brake pipe pressure for establishing communication through which fluid under pressure flows from said reservoir to said triple valve device.

22. In a fluid pressure brake, the combination with a brake pipe, a triple valve device and an auxiliary reservoir charged with fluid under pressure when the triple valve device is in brake releasing position, of a valve constantly preventing back flow of fluid under pressure from said reservoir to said triple valve device, valve means operative upon a predetermined brake pipe reduction for establishing communication through which fluid under pressure is supplied from said reservoir to said triple valve device to cause the triple valve device to operate to brake applying position, said means being operative to close said communication when the brake pipe and auxiliary reservoir pressures acting on said valve means are substantially equal, and means for establishing communication through which fluid under pressure is supplied from said reservoir to said triple valve device independently of said valve means when the triple valve device is operated to brake applying position.

23. In a fluid pressure brake, the combination with a brake pipe, a triple valve device and an auxiliary reservoir charged with fluid under pressure when the triple valve device is in brake releasing position, of a valve constantly preventing back flow of fluid under pressure from said reservoir to said triple valve device, valve means operative upon a predetermined brake pipe reduction for establishing communication through which fluid under pressure is supplied from said reservoir to said triple valve device to cause the triple valve device to operate to brake applying position, said means being operative to close said communication when the brake pipe and auxiliary reservoir pressures acting on said valve means are substantially equal, and means included in the triple valve device for establishing communication through which fluid under pressure is supplied from said reservoir to said triple valve device independently of said valve means when the triple valve device is operated to brake applying position.

24. In a fluid pressure brake apparatus for a rear car of a train, the combination with a brake pipe, of a triple valve device which is unresponsive to a reduction in brake pipe pressure at a slow rate for effecting an application of the brakes, of means operative upon a predetermined reduction in brake pipe pressure for supplying fluid under pressure to cause said triple valve device to operate to effect an application of the brakes when the reduction in brake pipe pressure is at said slow rate.

25. In a fluid pressure brake apparatus for a rear car of a train, the combination with a brake pipe, of a triple valve device which is unresponsive to a reduction in brake pipe pressure at a slow rate for effecting an application of the brakes, of valve means operative upon a predetermined light reduction in brake pipe pressure for supplying fluid under pressure to cause said triple valve device to operate to effect an application of the brakes when the reduction in brake pipe pressure is at said slow rate.

26. In a fluid pressure brake apparatus for a rear car of a train, the combination with a brake pipe, of a triple valve device which is unresponsive to a reduction in brake pipe pressure at a slow rate for effecting an application of the brakes, of a reservoir charged with fluid under pressure supplied through said triple valve device, a check valve for preventing back flow of fluid from said reservoir to said triple valve device, and means operative upon a predetermined reduction in brake pipe pressure for establishing communication through which fluid under pressure is supplied from said reservoir to said triple valve device to cause the triple valve device to operate when the brake pipe reduction is at said slow rate, to effect an application of the brakes.

27. In a fluid pressure brake apparatus for a rear car of a train, the combination with a brake pipe, of a triple valve device which is unresponsive to a reduction in brake pipe pressure at a slow rate for effecting an application of the brakes, of means operative upon a predetermined reduction in brake pipe pressure for supplying fluid under pressure to cause said triple valve device to operate to effect an application of the brakes when the reduction in brake pipe pressure is at said slow rate, and means operative to vent fluid under pressure from said brake pipe after said triple valve device is operated to effect an application of the brakes.

28. In a fluid pressure brake apparatus for a rear car of a train, the combination with a brake pipe, of a triple valve device which is unresponsive to a reduction in brake pipe pressure at a slow rate for effecting an application of the brakes, of means operative upon a predetermined reduction in brake pipe pressure for supplying fluid under pressure to cause said triple valve device to operate to effect an application of the brakes when the reduction in brake pipe pressure is at said slow rate, and means operative to accelerate the rate of brake pipe pressure reduction after said triple valve device is operated to effect an application of the brakes.

29. In a fluid pressure brake apparatus for a rear car of a train, the combination with a brake pipe, of a triple valve device which is unresponsive to a reduction in brake pipe pressure at a slow rate for effecting an application of the brakes, of means operative upon a predetermined reduction in brake pipe pressure for supplying fluid under pressure to cause said triple valve device to operate to effect an application of the brakes when the reduction in brake pipe pressure is at said slow rate, and pressure sensitive means operative when the triple valve is in brake applying position for effecting a predetermined reduction in brake pipe pressure at a predetermined rate.

30. In a fluid pressure brake apparatus for a rear car of a train, the combination with a brake pipe, of a triple valve device which is unresponsive to a reduction in brake pipe pressure at a slow rate for effecting an application of the brakes, of means operative upon a predetermined reduction in brake pipe pressure for supplying fluid under pressure to cause said triple valve device to operate to effect an application of the brakes when the reduction in brake pipe pressure is at said slow rate, means operative to vent fluid under pressure from said brake pipe after said triple valve device is operated to effect an application of the brakes, and a cock device operative to render said means ineffective to vent fluid under pressure from the brake pipe after an initial application of the brakes.

31. In a fluid pressure brake, the combination with a brake pipe, of a triple valve device, valve means operative upon a predetermined reduction in brake pipe pressure to supply fluid under pressure to the triple valve device for controlling the operation of the triple valve device to effect an application of the brakes, and a valve device controlled by said triple valve device for effecting a reduction in brake pipe pressure at a service rate.

32. In a fluid pressure brake, the combination with a brake pipe, of a triple valve device, valve means operative upon a predetermined reduction in brake pipe pressure for controlling the operation of said triple valve device to effect an application of the brakes, and means operated upon the operation of said triple valve device to brake applying position for effecting a reduction in brake pipe pressure at a service rate.

33. In a fluid pressure brake, the combination with a brake pipe, of a triple valve device, valve means operative upon a predetermined reduction in brake pipe pressure for controlling the operation of said triple valve device to effect an application of the brakes, a valve device controlled by said triple valve device for effecting a reduction in brake pipe pressure, and means included in said valve device for maintaining said valve device inoperative to reduce brake pipe pressure when the rate of brake pipe reduction exceeds a predetermined rate.

34. In a fluid pressure brake, the combination with a brake pipe, of a triple valve device, valve means operative upon a predetermined reduction in brake pipe pressure for controlling the operation of said triple valve device to effect an application of the brakes, a valve device controlled by said triple valve device for effecting a reduction in brake pipe pressure, and means included in said valve device for maintaining said valve device inoperative to reduce brake pipe pressure when the reduction in brake pipe pressure exceeds said predetermined reduction.

35. In a fluid pressure brake, the combination with a brake pipe, of a triple valve device, valve means operative upon a predetermined reduction in brake pipe pressure for controlling the operation of said triple valve device to effect an application of the brakes, a valve device controlled by said triple valve device for effecting a reduction in brake pipe pressure, said valve device being inoperative to effect a reduction in brake pipe pressure when the rate of brake pipe reduction exceeds a predetermined rate.

36. In a fluid pressure brake, the combination with a brake pipe, of a triple valve device, valve means operative upon a predetermined reduction in brake pipe pressure for controlling the operation of said triple valve device to effect an application of the brakes, a valve device controlled by said triple valve device for effecting a reduction in brake pipe pressure, said valve device being inoperative to effect a reduction in brake pipe pressure when the brake pipe reduction exceeds a predetermined amount.

CLYDE C. FARMER.
ELLIS E. HEWITT.